(12) United States Patent
Seerup et al.

(10) Patent No.: US 8,230,911 B2
(45) Date of Patent: Jul. 31, 2012

(54) METHOD FOR ADJUSTING SEVERAL PARALLEL CONNECTED HEAT EXCHANGERS

(75) Inventors: Joergen Seerup, Maarslet (DK); Niels Gregersen, Galten (DK)

(73) Assignee: Danfoss A/S, Nordborg (DK)

( * ) Notice: Subject to any disclaimer, the term of this patent is extended or adjusted under 35 U.S.C. 154(b) by 1270 days.

(21) Appl. No.: 10/550,096

(22) PCT Filed: Mar. 18, 2004

(86) PCT No.: PCT/DK2004/000180
§ 371 (c)(1),
(2), (4) Date: Aug. 31, 2006

(87) PCT Pub. No.: WO2004/083733
PCT Pub. Date: Sep. 30, 2004

(65) Prior Publication Data
US 2007/0000660 A1    Jan. 4, 2007

(30) Foreign Application Priority Data
Mar. 22, 2003  (DE) .................................. 103 12 825

(51) Int. Cl.
*F24D 19/10*    (2006.01)
*F24D 3/12*     (2006.01)
(52) U.S. Cl. .......... 165/296; 165/205; 165/294; 165/50; 165/56; 165/101; 165/293; 165/218; 165/219; 237/8 R; 237/63; 237/69; 236/91 F

(58) Field of Classification Search ................ 165/205, 165/294, 296, 50, 56, 101, 293, 218, 219; 237/8 R, 69, 63; 236/91 F
See application file for complete search history.

(56) References Cited

U.S. PATENT DOCUMENTS

| | | | | |
|---|---|---|---|---|
| 2,432,587 A * | 12/1947 | Ramsey | ......................... | 236/1 E |
| 4,708,287 A | 11/1987 | De Wit | | |
| 6,171,254 B1 * | 1/2001 | Skelton | ......................... | 600/490 |
| 6,390,381 B1 * | 5/2002 | Laing | ............................ | 237/8 R |
| 6,454,179 B1 * | 9/2002 | Neve et al. | ..................... | 237/2 A |

FOREIGN PATENT DOCUMENTS

| | | |
|---|---|---|
| DE | 3708449 | 9/1988 |
| DE | 19506628 | 8/1996 |
| DE | 19911866 | 11/1999 |
| DK | 37 08 449 A1 | 9/1988 |
| DK | 199 11 866 A1 | 9/2000 |

OTHER PUBLICATIONS

Corresponds to DE 100 57 361 A1.

\* cited by examiner

*Primary Examiner* — John Ford
(74) *Attorney, Agent, or Firm* — Buchanan Ingersoll & Rooney PC

(57) ABSTRACT

A method is provided for adjusting several parallel connected heat exchangers supplied with a coolant medium. The aim of the invention is to simplify the adjustment. For this purpose, the method consists in a) determining a specific value of heat requirement for each heat exchanger in a predetermined time period; b) comparing the specific values of all heat exchangers therebetween and c) in modifying the adjustment of the heat exchanger having the lowest specific value of heat requirement in such a way that the heat requirement thereof is increased.

16 Claims, 4 Drawing Sheets

METHOD FOR ADJUSTING SEVERAL PARALLEL CONNECTED HEAT EXCHANGERS

FIELD OF THE INVENTION

The invention concerns a method for adjusting several parallel connected heat exchanges, which are supplied with a heat carrying medium.

BACKGROUND OF THE INVENTION

A heating system with several parallel connected heat exchangers is known from, for example, DE 100 57 361 A1. The heat exchangers are partly made as radiators, partly as heat exchangers for a floor heating system. They are parallel connected, that is, they are supplied from the same source. In the known case, this is a boiler, which feeds an inlet line via a mixing valve.

In a similar manner, the method can also be used for adjusting heat exchangers, which are not serving the heating of a room, but the cooling. While for the heating of a room a fluid is used as heat carrying medium, whose temperature is higher than the temperature of the room to be heated, for example heated water, a corresponding fluid, whose temperature is lower, is used for cooling. However, in principle the problems are the same in both cases.

In the following, the invention is described in connection with a heating system. As mentioned, however, it can also be used for corresponding room cooling. The invention is particularly suited for use with floor heating systems.

In floor heating systems the individual heating circuits provide different flow resistances to the heat carrying medium. In this connection, a heating circuit comprises a heat exchanger with its inlets and outlets, however, distinguishing between the heat exchanger and the inlet often being difficult in floor heating systems. The different flow resistances are, for example caused by the fact that one heating circuit must supply a larger room than another and therefore the pipe in the floor is longer. When two such heating circuits with different resistances report a heat demand at the same time, the larger share of the heat carrying medium will flow into the heating circuit with the smallest resistance. This is unfavourable, as the heating circuit then does not utilise the total heat of the heat carrying medium, which increases the return temperature from this heating circuit. At the same time, the other heating circuit does not get sufficient heat carrying medium, so that here the heat supply is insufficient.

Desired is, however, a behaviour, which ensures that the heating circuit with the larger resistance receives the major share of the heating fluid, whereas the heating circuit with the smaller flow resistance receives a correspondingly smaller share.

In order to achieve this goal, at present a manual adjustment is made during the installation. In some cases, this adjustment is also called "compensation" or "flow limitation". During this adjustment, the flow resistances of the individual heating circuits, that is, the individual heat exchangers, are changed so that they get a "suitable" hydraulic resistance. When, then, several heating circuits, in the present case two, report the same heat demand, the heating fluid will split up according to the demand.

This method is practised in such case at present. However, it is not always satisfactory. Firstly, each heating circuit needs a throttle, which is accessible from the outside, by means of which the flow resistance can be adjusted. Secondly, a calculation of the setting is required. This is often made in that the flow resistance of the individual heating circuit is calculated. In many cases, such a calculation is not very exact. More exact settings can be made by means of a measuring of the flow resistance or the volume flow through the individual heating circuits. However, this method is relatively expensive. By means of the measured or calculated values, the individual heating circuits must be set.

Additionally, the flow resistance of the individual heating circuits is in many cases only an insufficient criterion for the supply of the individual heating circuits. Also the heat resistance of the floor in a floor heating system or the heat demand of a room can have an influence on the setting. For example, the head demand with a carpeted floor will be different than with a floor tile floor.

A room facing south, which is more frequently exposed to sun radiation, will have a different heat demand than a room on the weather side, for example facing north.

SUMMARY OF THE INVENTION

The invention is based on the task of providing an easier setting.

This task is solved in making the following steps:
a. Detecting for each heat exchanger a specific size of the heat demand of the heat exchanger in a predetermined period,
b. comparing the specific sizes of all heat exchangers with each other and
c. changing the setting of the heat exchanger with the specific size displaying the smallest heat demand in a manner, which increases the heat demand.

With this method, the heat exchanger having the largest consumption of heat carrying medium is, in a manner of speaking, "punished". In the future, it will receive a smaller share of the heat carrying medium, in that it's setting is changed, meaning that, for example, the flow amount is reduced. Here, there are several possibilities, which will be explained in the following. For example, a specific size can be used, which is formed by a ratio between opening times of a valve controlling the flow amount of a heat carrying medium through the heat exchanger, and the predetermined period, or by a desired value deviation. The correction then occurs in that the ratio of the opening times to the predetermined period in the first case or the desired value deviation in the second case is reduced. Sooner or later, this will ensure that all heat exchangers get the same priority, in that all heat exchangers have the same resistance and thus can demand the same heat amount. This is the object of the control. Thus, also the volume flow through the heat exchangers is maximised, which is a clear advantage, for example in connection with floor heating systems, as thus differences in the surface temperature of the floor can be avoided. The specific size used is, for example as mentioned above, in a first case a ratio between opening times of a valve, which controls the flow amount of the heat carrying medium through the heat exchanger and the predetermined period. In other words, a duty cycle of the valve is used. When, in the predetermined period of, for example 48 hours, the valve is open for twelve hours, the ratio is 0.25. Usually, a heat exchanger with a small resistance has a small opening ratio, and a heat exchanger with a large resistance has a large opening ratio (of course on condition that the variations of the heat demand and of the floor design are small). Now, with a heat exchanger, whose valve has a small opening ratio, the setting can be changed so that the flow amount is reduced. In this case, the valve is forced to remain open longer, to permit the required amount of heat carrying fluid to pass to the heat exchanger. In a further embodiment, a desired value deviation of each heat exchanger can be determined as specific size and a setting of the heat exchanger with the smallest desired value deviation can be made. The heat exchanger having the smallest desired value deviation is thus "punished", as in the future it will receive less heat carrying medium. In many cases, the desired value deviation is easily determined, as it is needed for the operation of a controller anyway. In order to simplify the understanding, the following description is based on the assumption that with a small heat demand the specific size is large and with a large heat demand the specific size is small. Depending of the concrete determination of the specific size, the conditions can also be vice versa.

Preferably, the setting of all heat exchangers is changed in this manner, except for the heat exchangers, whose specific size displays the largest heat demand. Thus, the desired setting of all heat exchangers can be realised relatively fast. The predetermined period should have a certain duration, for example 48 hours or even seven days. In principle, this period merely serves the purpose of keeping the effects of undesired influences small, as the setting should not be changed during air renewal or sun radiation. The period required for forming a mean value is relatively long. As, however, the setting can be changed for relatively many heat exchangers at the same time, this long period is uncritical, once it has passed. Then, in a manner of speaking, a time window is placed over the system, so that changes, which occur by season, can also become part of the setting of the heat exchangers.

Preferably, the setting of at least one other heat exchanger is changed so that the specific size is increased, that is the heat demand is reduced. When, for example, the flow amount is always only reduced, there is a theoretical possibility that sometime the flow amount has fallen to zero and no heat exchanger is supplied with heat any longer. This case is safely avoided by the increase of the specific size in particular cases.

In a particularly preferred embodiment, it can be endeavoured that an opening period in the range from 50 to 80% of the predetermined period is set for all heat exchangers. For example, it may be ensured that the final result for all heat exchangers, or rather, their valves will be a duty cycle of 0.6. This means that all valves are open for 60% of their predetermined periods. The exact values of course also depend on the inlet temperature of the system, in which the heat exchangers are located.

In a preferred embodiment it is ensured that a common return temperature for the heat exchangers is determined and that it is established, at which heat exchanger the return temperature increases or decreases, when the heat exchanger is opened or closed, the setting of a heat exchanger being changed by way of a reduction of the specific size, when the return temperature increases at the opening of this heat exchanger. In the ideal case all heat exchangers should have the same return temperature, when the floor design and the heat demand per area of the heat exchangers are the same for all heat exchangers. When, now, it turns out that the return temperature increases, when a heat exchanger opens, this indicates that in principle this heat exchanger receives too much heat carrying medium. It is thus "punished", as the specific size is reduced, for example in that the flow amount is throttled. When, however, it is established that the return temperature drops after opening a heat exchanger, this heat exchanger must supply too much heat, that is, the heat carrying medium returning from this heat exchanger is too cold. In the future, it will be supplied with more heat carrying medium.

Preferably, the setting is changed by a change of an amplification in a controller. The controller can, for example, be a thermostat element, a motor valve or an electrical p-band adjuster, in which the "punishment" is a change of the amplification. In many cases, this can easily be realised.

Alternatively or additionally, a pressure difference over the heat exchanger can be changed. With the same opening width of the valve, a larger pressure difference will cause an increased flow amount. The pressure difference can, for example, be changed in that a throttle with a larger or smaller flow resistance is arranged at the inlet or at the outlet. Also a pump control can be used to change the pressure difference.

In a further embodiment, it is ensured that the setting is changed in that the maximum opening width of the valve of the heat exchanger is changed. When, for example, the maximum opening width is reduced, the valve is forced to remain open longer. This is particularly advantageous, when the duty cycle of the valve is used as specific size.

Finally, the setting can be changed by changing the opening times of the valve. In this case, it is advantageous that during opening periods, which are determined by a heat demand, the valve is periodically closed.

BRIEF DESCRIPTION OF THE DRAWINGS

In the following, the invention is described in detail on the basis of preferred embodiments in connection with the drawings, showing.

DESCRIPTION OF THE PREFERRED EMBODIMENTS

Figure 1:
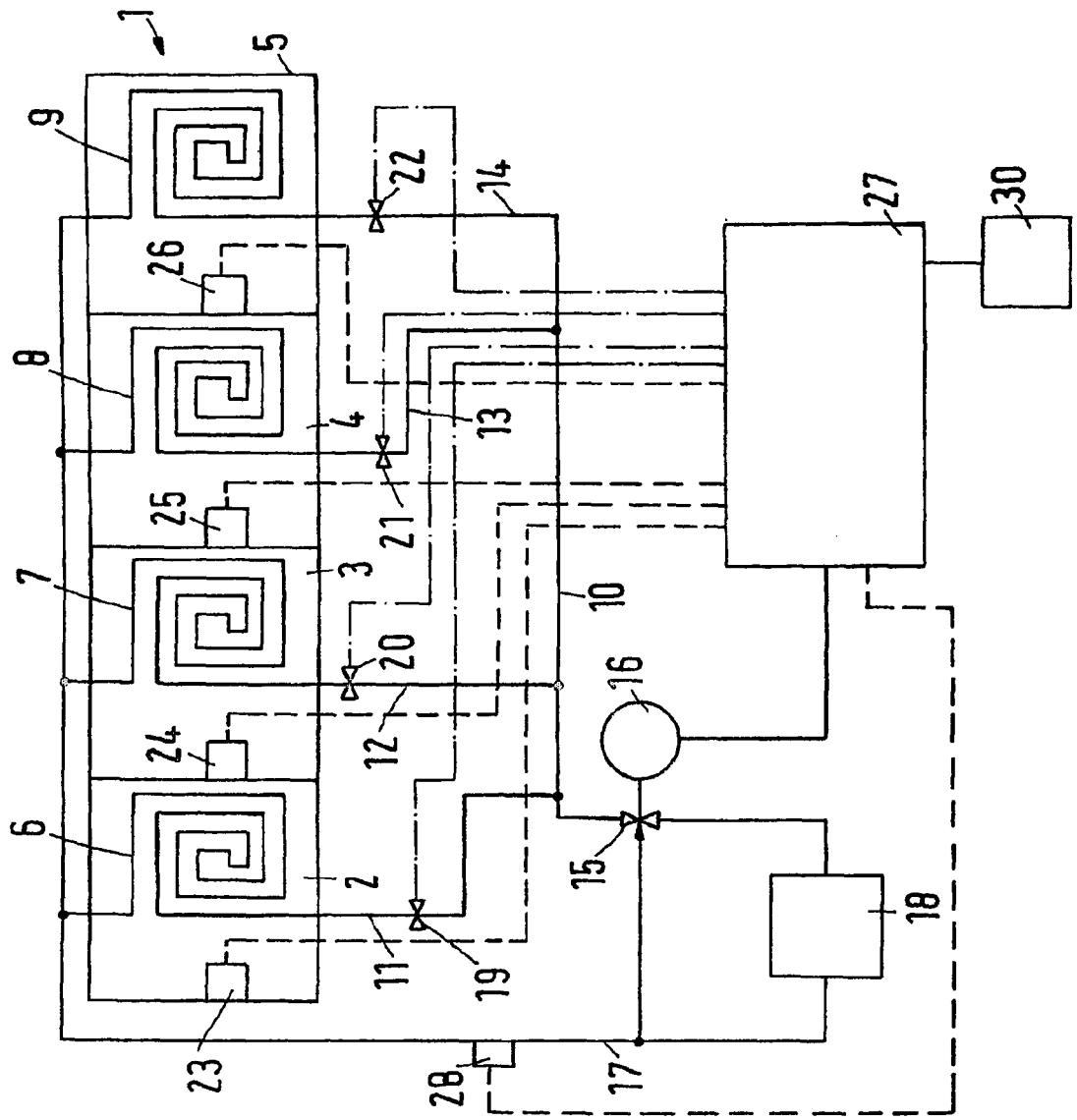
FIG. 1 a schematic view of a heating system.

FIG. 1 shows a heating system 1 for heating several rooms 2 to 5 in a house. Each room has a floor heating. For this purpose, heat exchangers 6 to 9 are shown.

In the following, the invention is explained on the basis of a heating system with floor heating. However, it is obvious that the principle of the setting or compensation explained in the following can also be used for heating systems working with radiators or heating systems, in which a floor heating is used together with radiators.

In a similar manner, the invention can also be used with ceiling cooling systems, which do not lead hot water through radiators or heat exchangers for heating a room, but cold water (or another heat carrying fluid) for cooling a corresponding room.

In the present case, the individual heat exchangers 6 to 9 are passed by a heating fluid, namely hot water, which is distributed to the individual heat exchangers 6 to 9 from an inlet pipe 10 branching off into the individual feeder pipes 11 to 14. At the inlet of the inlet pipe 10 is located a mixing valve 15, which can be adjusted by, for example, an electric motor via a regulating unit 16. By means of the mixing valve 15, cold water from a return pipe 17, which receives the heating water from the heat exchangers 6 to 9, can be added. In this way, it is possible to reduce the inlet temperature below a temperature, which originates from a heating boiler 18 (or another heating source.

The heating fluid amount, which is actually led to each heat exchanger 6 to 9, is determined by valves 19 to 22. These valves are controlled by a common control device 27. For this purpose, dotted lines are shown as connections between the valves 19 to 22 and the control device 27. These line paths can on the one side be actually available signal lines, for example in the form of electrical lines or glass fibre lines. However, they can also be made as wireless paths, when the corresponding information between the control device 27 and the valves 19 to 22 are transmitted by electromagnetic waves, for example radio waves.

The control device 27 receives the information about the temperature in each room 2 to 5 via temperature sensors 23 to 26 located in each room 2 to 5. The related line paths are shown with dotted lines. Also here, the corresponding line paths can be actual lines. However, the paths can also be wireless, for example by means of radio waves.

The separation of the valves 19 to 22 from the temperature sensors 23 to 26 as shown in FIG. 1 does not necessarily have to exist. The valves 19 to 22 and the temperature sensors 23 to 26, respectively, can be combined in one component like a radiator thermostat valve. Such an embodiment is particularly expedient, when, a radiator is used instead of the heat exchangers 6 to 9 for a floor heating. Also when combining valves and temperature sensors in one component, however, there is a connection between the radiator thermostat valves and the control device 27.

A sensor 28 is located in the return pipe 17, which returns the heating water from all heat exchangers 6 to 9 to the mixing valve 15 or to the heating boiler 18, respectively. Also the sensor 28 is connected with the control device 27. Finally, also an outdoor temperature sensor 30 can be connected with the control device 27.

The heat exchangers 6 to 9 do not all have the same flow characteristic. A heat exchanger having to heat a larger room, usually also has a longer flow length and thus a larger flow resistance than a heat exchanger, which is provided for a smaller room. Without additional measures, this causes that, when both heat exchangers report a heat demand, for example because of a signal of the temperature sensor 23 to 26, and the valves 19 to 22 are opened, the largest share of the heating water will flow into the heat exchanger, which has the smallest flow resistance. This has several disadvantages. Firstly, it causes an increased return temperature from this heat exchanger, as the heating water has not been sufficiently cooled. Secondly, the heat exchanger with the largest flow resistance is insufficiently supplied, so that it does not heat the room sufficiently. Desired is, however, a behaviour, in which (in the present example) the heat exchanger with the largest flow resistance also receives the largest share of the heating water.

Additionally, the flow resistance of the heat exchanger is not necessarily the only criterion. Also the heat resistance of the floor or the heat demand of the room are criteria for the required amount of heating water of the individual heat exchanger to produce the desired temperature in the room in the most efficient manner. For example, it makes a difference, if the floor is covered by a carpet or by floor tiles. Also a room facing south will need less heating water than a room facing north.

Usually, a setting adjustable from the outside is used to provide all heat exchangers 6 to 9 with the same priority. This, however, is expensive and can normally not be realised with the required accuracy. Therefore, in the present case a different method is used.

In the period, in which the heat exchangers 6 to 9 "consume" heat, that is, have a demand for heating fluid, which is detected by the temperature sensors 23 to 26, an opening behaviour A is defined. A heat exchanger, which was active for, for example, 12 hours during the latest 48 hours, has the opening ratio A=12/48=0.25. This opening ratio can also be called "mark space ratio".

Usually, a heat exchanger with a small flow resistance has a small opening ratio and a heat exchanger with a large flow resistance has a large opening ratio (assuming in connection with this generalisation that the variations in the heating demand and in the floor design are small).

In order to provide all heat exchangers with the same priority, in other words, to provide them with the same opening ratio, the following method is used:

The average opening ratio for all heat exchangers is measured over a predetermined period of, for example, 48 hours. The opening ratio is defined to be the share of the total period, in which the measured temperature is below the desired value, divided by the predetermined period. Instead of 48 hours, also other periods can be defined as predetermined period, for example a week. The predetermined period primarily serves the purpose of avoiding undesired influences. Thus, the "setting" shall not be changed during air renewal or when the sun shines.

Then, the opening ratios A of all heat exchangers 6 to 9 are compared, and the opening ratio is used as a specific size.

The heat exchanger with the smallest opening ratio A is "punished". Only the heat exchanger with the largest opening ratio remains unpunished. The "punishment" means that the flow through the punished heat exchangers is reduced. This can be made in different manners, for example, in that a heat exchanger is forced to remain closed, also when actually it demands heat. Alternatively, the lifting height of the valves 19 to 22 can be limited, that is, the heat exchanger receives less heating fluid as usual, meaning that it has to demand heat for a longer period, which leads to the desired larger opening ratio. After a certain period, all heat exchangers 6 to 9, or rather their valves 19 to 22, will have the same opening ratio. This opening ratio can, for example, be in the range from 0.5 to 0.8. A favourable opening ratio is, for example, 0.6.

Under certain circumstances, it may be favourable to reward the heat exchanger(s) with the largest opening ratio at the same time as the heat exchanger with the smallest opening ratio is "punished", that is, to ensure that the flow amount through this heat exchanger is increased. The "reward" can also be a less severe "punishment".

Two possibilities of changing the setting of the heat exchangers 6 to 9 are shown in the FIGS. 2 to 6.

Figure 2:
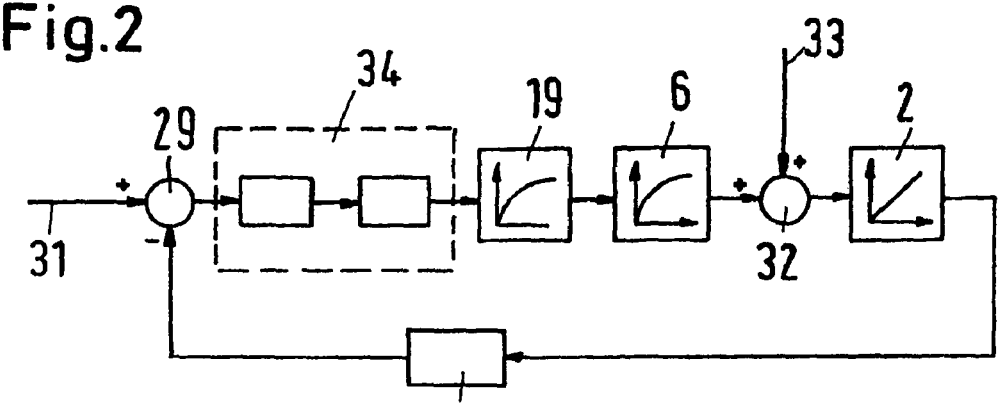
FIG. 2 a schematic view of a control circuit for a heat exchanger.

FIG. 2 shows a control circuit as an example for the room 2. The elements here have the same reference numbers as in FIG. 1. The inlet of heating fluid to the heat exchanger 6 is controlled by the valve 19, which then influences the temperature in the room 2. This temperature is determined by the temperature sensor 23 and fed back to an addition point 29, which also receives the desired value via a desired value inlet 31. A further addition point 32 is shown schematically, at which interfering sizes 33, for example, external temperature influences, can be considered. Such interfering sizes can be external temperature influences, which are, for example, caused by increased sun radiation or by an air renewal in the room.

Figure 3:
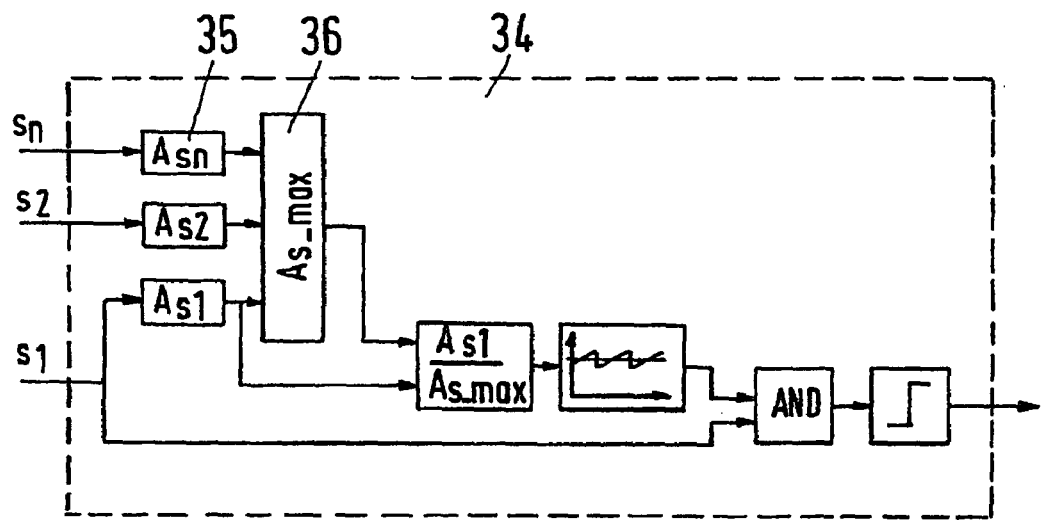
FIG. 3 a schematic view of a controller

Between the addition point 29 and the valve 19 is located a controller 34, which is explained in the following on the basis of FIG. 3.

Figure 4A:
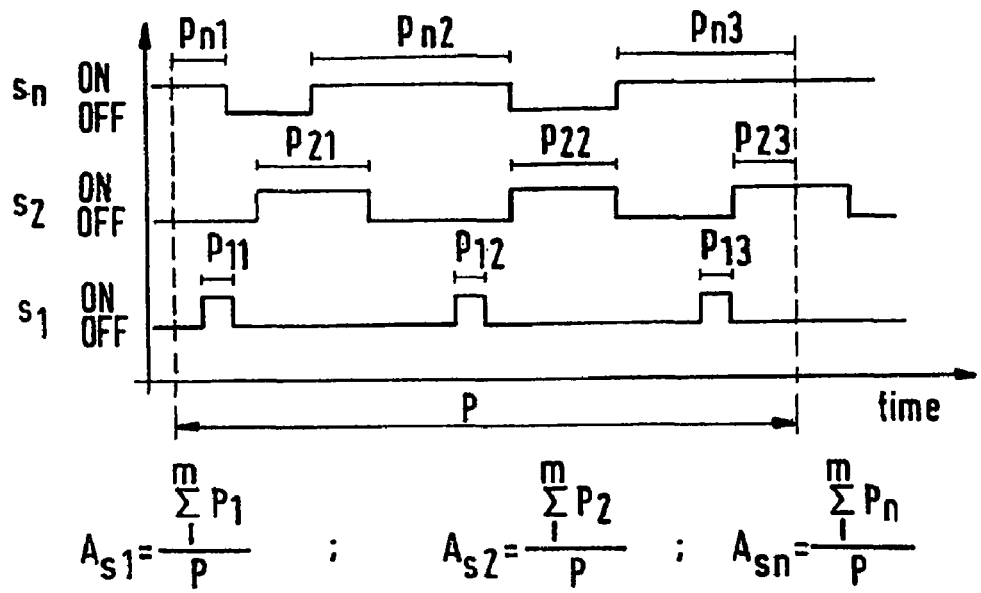
FIG. 4 several time courses explaining the controller according to FIG. 3.

Via the control device 27, the controller 34 does not only receive the opening signal S1 for the valve 19, that is, its own control circuit, but also the signal S2 . . . . Sn for the remaining control circuits. These signals are shown in FIG. 4*a*, in which they are drawn over a predetermined period P. For each signal S1 . . . . Sn an opening ratio is determined on the basis of the following formula:

$$Asn = \frac{\sum_{1}^{m} Pn}{P}$$

Pn being the opening periods in the signal Sn and m being the number of opening periods. On the basis of this opening ratio, which can also be called mark space ratio, the demand for heat carrying fluid can be determined. For calculating the mark space ratio, calculation units 35 are provided. Of course, each controller 34 does not have to have its own calculation unit. The calculations can also be made centrally in the control device 27.

In a maximum value generator 36 the largest duty cycle As-max is determined, and on the basis of this largest opening ratio and the opening ratio of the presently controlled valve a ratio is formed:

$$\frac{Asn}{As-\max}$$

Figure 4B:
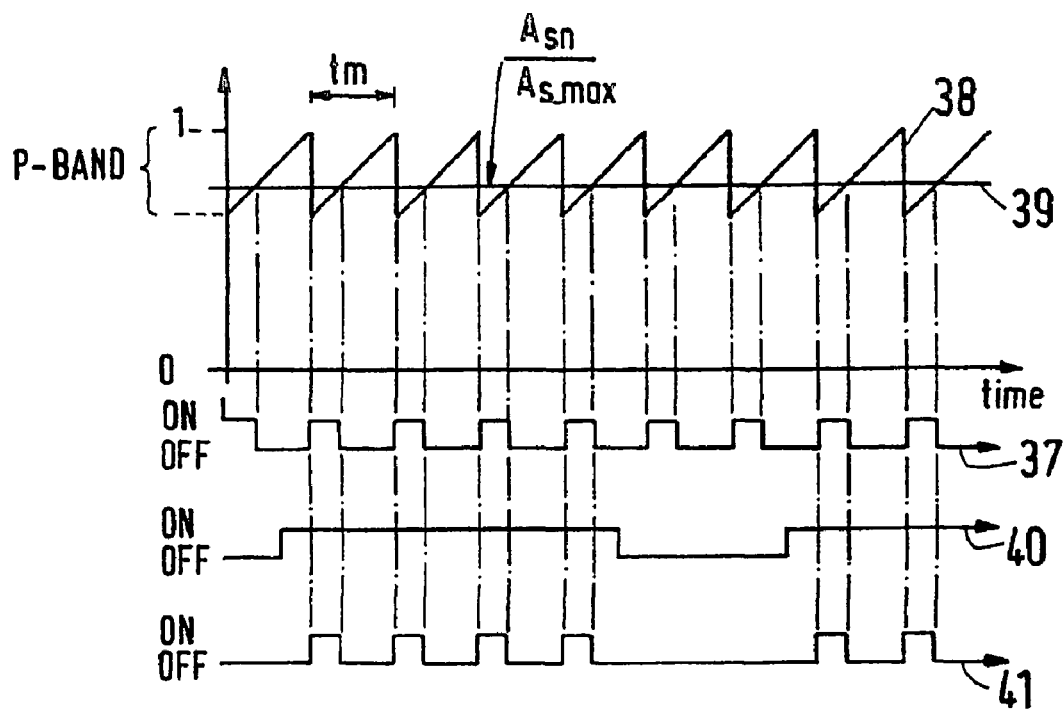

A P-band controller receives this size, and accordingly forms a punishment signal 37 shown in FIG. 4b. This punishment signal is formed as follows: A saw-tooth shaped signal with a period tm and a predetermined rise are currently compared with the opening relation Asn/As-max. As long as the opening ratio is smaller than the saw-tooth signal 38, the punishment signal 39 is on. As soon as the saw-tooth signal 38 exceeds the opening ratio signal 39, the punishment signal 37 is off.

Under the punishment signal 37, the unprocessed control signal 40 for the valve 19 is shown. This control signal 40 is now logically linked with the punishment signal to get the actual control signal 41. The actual control signal 41 is only "on"; when both the unprocessed control signal 40 and the punishment signal 37 are "on". In the remaining periods, the processed control signal 41 is "off". In this manner, the flow through the heat exchanger 6 can be reduced. It can be seen that with a larger opening ratio the curve 39 is displaced upwards, so that the punishment signal 37 "cuts off" less shares from the unprocessed control signal 40.

Finally, a simple on/off control is concerned, with which the flow of heating fluid through the heat exchangers 6 to 9 can be controlled in dependence of the heat demand of all heat exchangers 6 to 9, which are connected to the same inlet line 10.

Figure 5:
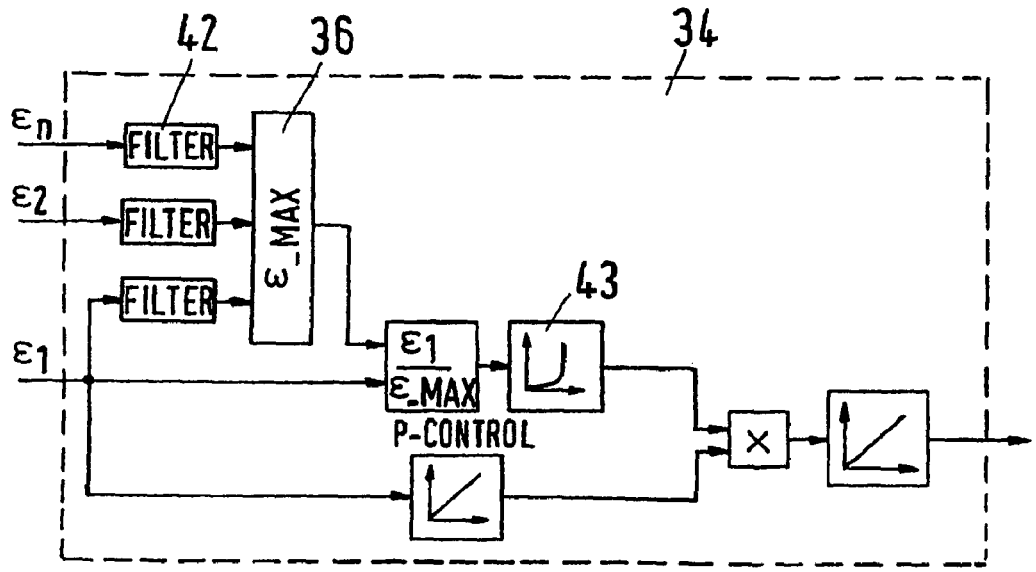
FIG. 5 another embodiment of a controller.
Figure 6A:
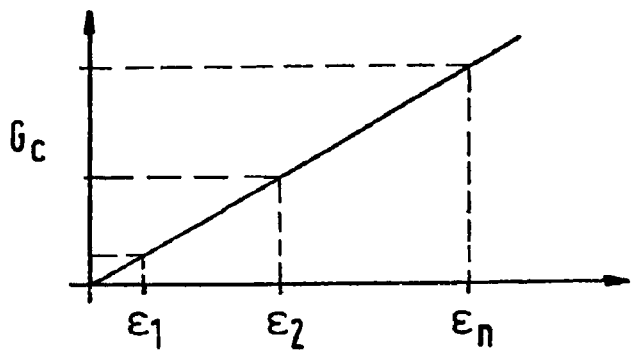
FIG. 6 views explaining the mode of functioning of the controller according to FIG. 5.
Figure 6B:
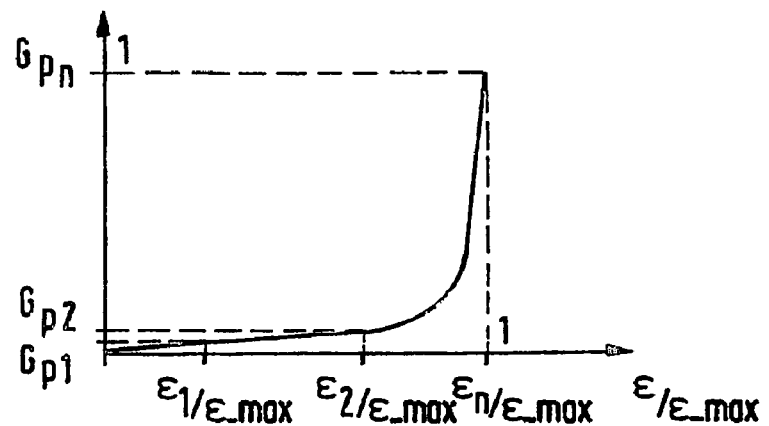
Figure 6C:
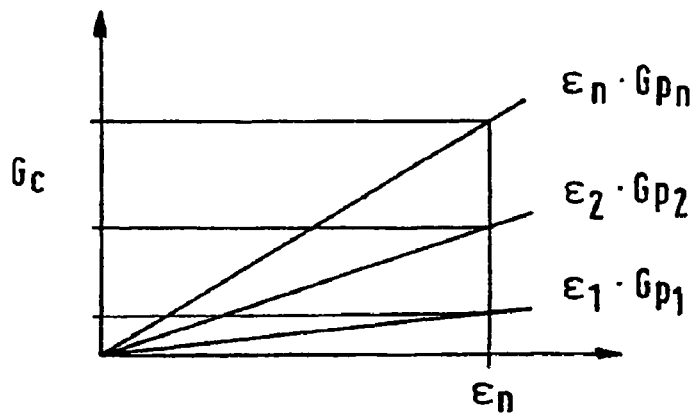

FIG. 5 shows a second possibility. Here, the controller 34 receives not only the desired value deviation 61 of its own control circuit, but also the desired value deviations ∈2 . . . . ∈n of the other control circuits, which are connected to the same inlet line 10. Via filters 42, these desired value deviations are led to a maximum value generator 36. From the actual desired value deviation ∈n and the maximum desired value deviation ∈-max a quotient is formed, which represents the relative desired value deviation. The relative desired value deviation is led to a punishment factor generator 43, which generates an amplification factor Gpn in dependence on the relative desired value deviation. A corresponding curve course with the punishment factor is shown in FIG. 6b. This punishment factor is then multiplied by the controller signal shown in FIG. 6a, so that the amplification factors at different desired value deviations shown in FIG. 6c occur. For example, the "punishment" may consist in that smaller thermostat valve amplifications are made or that a smaller differential pressure over the individual heat exchangers during the control of string valves.

With the temperature sensor 28 in the return line 17 as shown in FIG. 1, further advantages can be achieved. The temperature in the return line 17 can namely be used as a further criterion for determining, if the supply to the heat exchangers 6 to 9 is optimal.

When, for example, a heat exchanger 6 to 9 opens or closes, the common return temperature will change relatively fast. When the specific heat exchanger and its influence on the return temperature are known, differences in the floor design and in the heat demand can be compensated in the following manner.

The common return temperature is determined before opening and closing a heat exchanger. The temperature is determined after opening or closing the heat exchanger. When the temperature increases at each opening of the heat exchanger and decreases at each closing, the heat exchanger is punished, that is, the flow amount is throttled. In the opposite case, the heat exchanger is rewarded, that is, it receives more heat carrying fluid.

Such a control is particularly advantageous, when the desired value deviation is known. When this is not considered, other measures must be taken to prevent that the heat exchanger can be so "severely" punished that it cannot supply the required heat at a given inlet temperature.

The compensation or setting can also be combined with an inlet temperature control as described in DE 100 57 361 A1. This causes that further to a similar heat demand from all heat exchangers 6 to 9 also the same heat demand is achieved throughout the heating season independently of the load.

The invention claimed is:

1. A method for adjusting several parallel connected heat exchangers, which are supplied with a heat carrying medium, comprising the steps of:
   a. detecting for each heat exchanger a specific size of the heat demand of the heat exchanger, said specific size representing either 1) a ratio between opening times of a valve controlling the flow amount of a heat carrying medium through the heat exchanger and a predetermined period, or 2) a deviation of a desired value;
   b. comparing the specific sizes of all heat exchangers with each other; and
   c. changing the setting of the heat exchanger with the specific size displaying the smallest heat demand in a manner which increases the heat demand,
   the method further comprising the steps of determining a common return temperature for the heat exchangers before opening or closing one of the heat exchangers, determining the common return temperature after opening or closing said one of the heat exchangers, comparing the common return temperature before opening or closing said one of the heat exchangers with the common return temperature after opening or closing said one of the heat exchangers, and, when the common return temperature increases as a result of each opening of said one of the heat exchangers or decreases as a result of each closing of said one of the heat exchangers, changing the setting of said one of the heat exchangers so as to reduce a specific size of the heat demand of said one of the heat exchangers.

2. The method according to claim 1, further comprising the step of changing the setting of at least one other heat exchanger so that the specific size is increased.

3. The method according to claim 1, further comprising the step of setting an opening period in the range from 50 to 80% of the predetermined period for all heat exchangers.

4. The method according to claim 1, further comprising the step of changing the setting by a change of an amplification in a controller.

5. The method according to claim 1, further comprising the step of changing the setting by changing a pressure difference over the heat exchanger.

6. The method according to claim 1, further comprising the step of changing the setting so that the maximum opening width of the valve of the heat exchanger is changed.

7. The method according to claim 1, further comprising the step of changing the setting by changing the opening times of the valve.

8. The method according to claim 7, further comprising the step of periodically closing the valve during opening periods, which are determined by a heat demand.

9. The method according to claim 1, further comprising the step of changing the setting of all heat exchangers, except for the heat exchangers whose specific size displays the largest heat demand.

10. The method according to claim 9, further comprising the step of changing the setting of at least one other heat exchanger so that the specific size is increased.

11. The method according to claim 9, further comprising the step of setting an opening period in the range from 50 to 80% of the predetermined period for all heat exchangers.

12. The method according to claim 9, further comprising the step of changing the setting by a change of an amplification in a controller.

13. The method according to claim 9, further comprising the step of changing the setting by changing a pressure difference over the heat exchanger.

14. The method according to claim 9, further comprising the step of changing the setting so that the maximum opening width of the valve of the heat exchanger is changed.

15. The method according to claim 9, further comprising the step of changing the setting by changing the opening times of the valve.

16. The method according to claim 15, further comprising the step of periodically closing the valve during opening periods, which are determined by a heat demand.

* * * * *